United States Patent [19]

Kohno et al.

[11] Patent Number: 4,958,852
[45] Date of Patent: Sep. 25, 1990

[54] TILT STEERING DEVICE

[75] Inventors: Masahito Kohno; Yoshiyuki Nakamura, both of Osaka, Japan

[73] Assignee: Koyo Seiko Co., Ltd., Osaka, Japan

[21] Appl. No.: 403,423

[22] Filed: Sep. 6, 1989

[30] Foreign Application Priority Data

Sep. 8, 1988 [JP] Japan .................................. 63-225426
Nov. 17, 1988 [JP] Japan .................................. 63-292022

[51] Int. Cl.$^5$ .............................................. B62D 1/18
[52] U.S. Cl. ........................................ 280/775; 74/493
[58] Field of Search .................... 280/775, 779; 74/493

[56]  References Cited

U.S. PATENT DOCUMENTS

| 4,538,478 | 9/1985 | Sato et al. | 280/775 |
| 4,593,577 | 6/1986 | Kinoshita | 280/775 |
| 4,750,379 | 6/1988 | Nishikawa et al. | 280/775 |
| 4,819,498 | 4/1989 | Nishikawa et al. | 280/775 |
| 4,876,910 | 11/1989 | Nishikawa et al. | 280/775 |

Primary Examiner—Kenneth R. Rice
Attorney, Agent, or Firm—Armstrong, Nikaido, Marmelstein, Kubovcik & Murray

[57] ABSTRACT

A tilt steering device comprising a fixed bracket fixed to the body of a vehicle and supporting a lower steering shaft thereon by a lower column, a tilt bracket pivoted to the fixed bracket and supporting an upper steering shaft thereon by an upper column, the upper steering shaft being connected to the lower steering shaft by a universal joint, a spring provided between the fixed bracket and the tilt bracket and biasing the tilt bracket into an upward pivotal movement, a pivot member secured to the fixed bracket, a stopper member pivotally movably attached to the pivot member and selectively movable to a usual operation position or a retraction position, engaging means provided between the tilt bracket and the stopper member to hold the tilt bracket in an operation position against the spring when the stopper member is in its operation position or to permit the tilt bracket to be pivotally moved to an upward retracted position by the spring when the stopper member is in its retraction position, a retraction control lever pivotally movably attached to the pivot member so as to be selectively movable to an operation position or a retraction position, and change-over means provided between the control lever and the stopper member for holding the stopper member in its operation position when the control lever is in its operation position or permitting the stopper member to move to its retraction position when the control lever is in its retraction position.

8 Claims, 17 Drawing Sheets

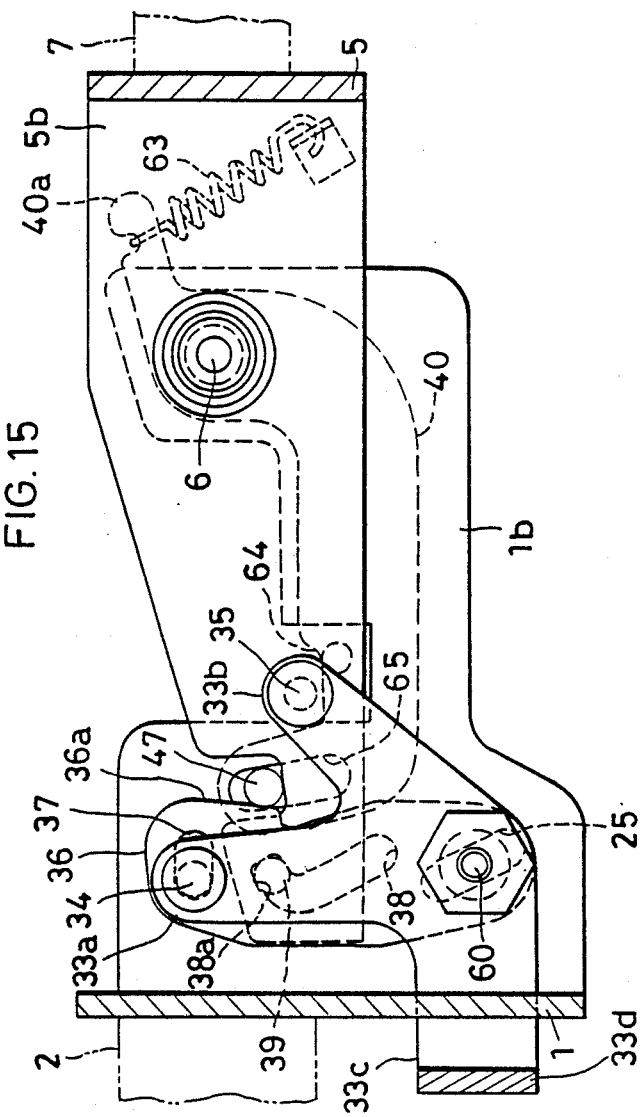
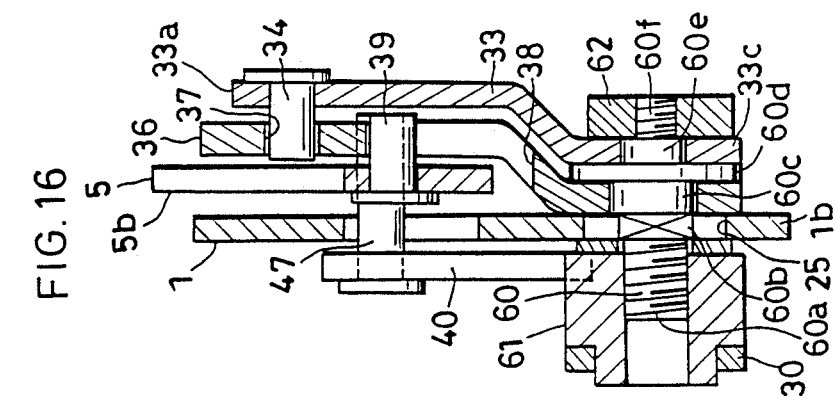

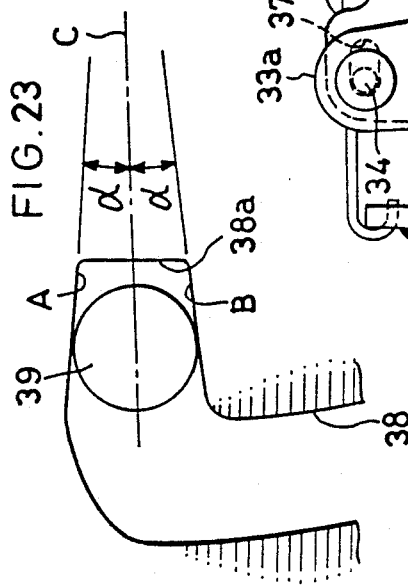
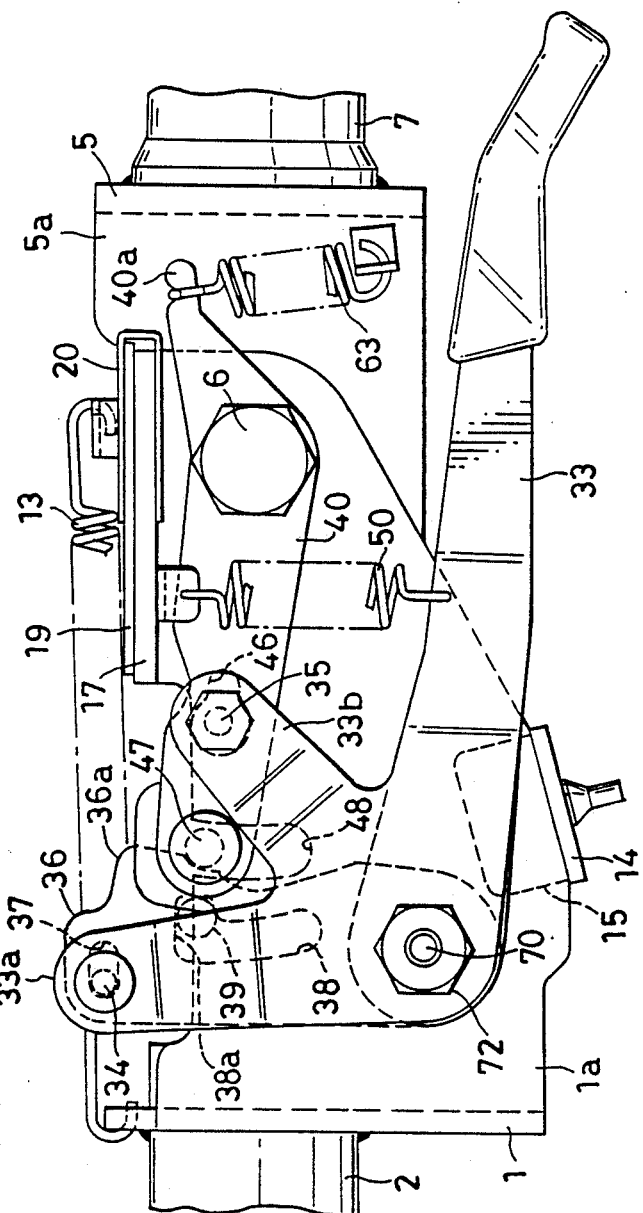

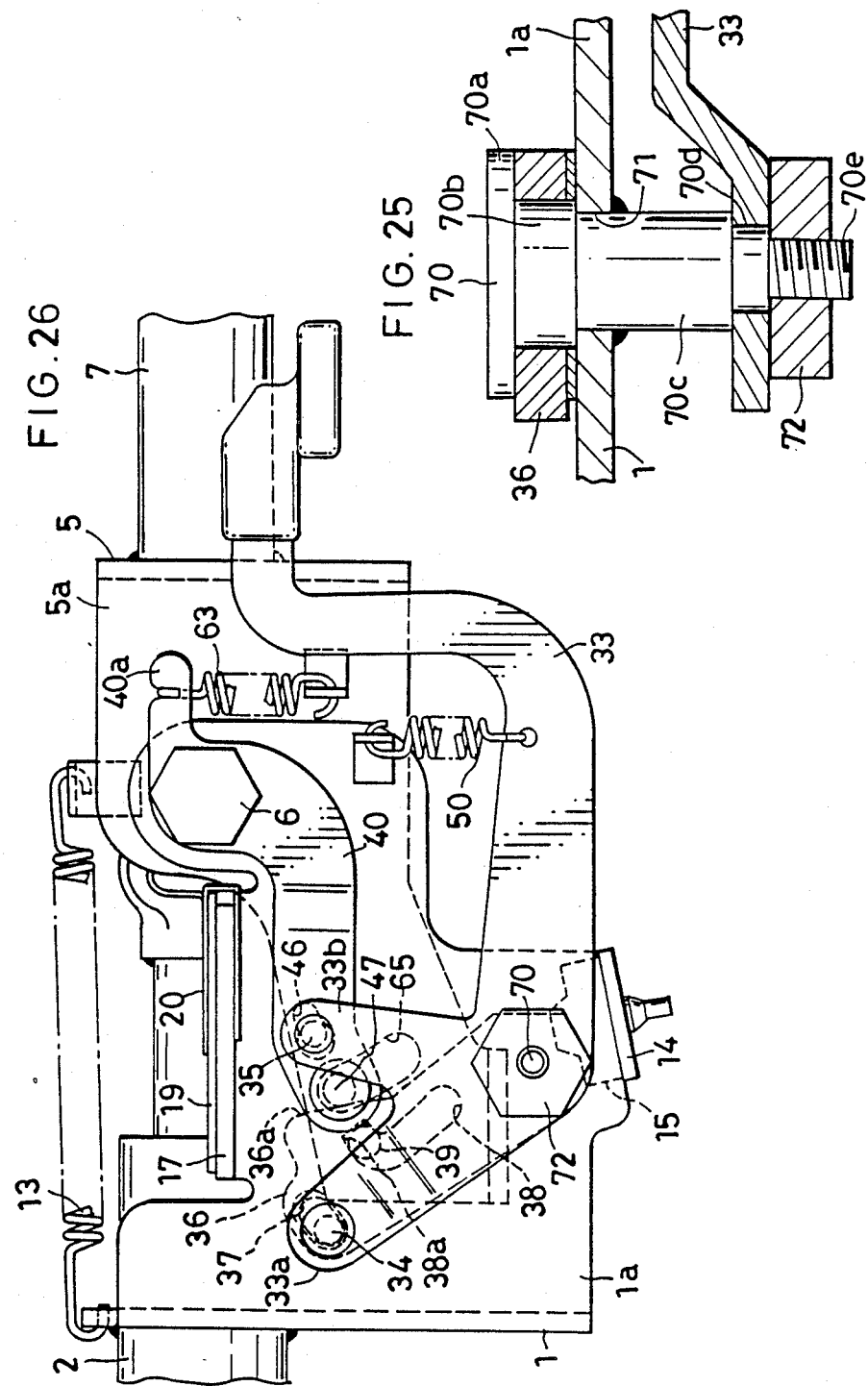

TILT STEERING DEVICE

BACKGROUND OF THE INVENTION

The present invention relates to tilt steering devices, and more particularly to a tilt steering device having the function of retracting a steering wheel to an upwardly retracted position Such tilt steering devices are known which comprise a tilt bracket pivoted to a bracket fixed to the body of a vehicle, and a control lever for finely adjusting the position of a steering wheel upward or downward and for retracting the steering wheel. A lower steering shaft is supported by a lower column on the fixed bracket, and an upper steering shaft is supported by an upper column on the tilt bracket. The lower steering shaft is connected to the upper steering shaft by a universal joint, the center of which is positioned on a line about which the tilt bracket is pivotally movable. The steering wheel is attached to the upper end of the upper steering shaft.

With such a conventional device, however, the steering wheel as retracted can not be returned to the original adjusted position but needs to be finely adjusted again.

Unexamined Japanese Patent Publication No. SHO 57-155156 discloses a tilt steering device which is free of this problem.

The disclosed device nevertheless requires a complex construction for returning the retracted steering wheel to the initial adjusted position. Moreover, when to be retracted, the steering wheel must be moved upward with the hand while moving the control lever, hence a cumbersome procedure.

SUMMARY OF THE INVENTION

The main object of the present invention is to provide a tilt steering device which is adapted to automatically shift the steering wheel to a retracted position only by manipulating a control lever.

The tilt steering device of the present invention comprises a fixed bracket fixed to the body of a vehicle and supporting a lower steering shaft thereon by a lower column, a tilt bracket pivoted to the fixed bracket and supporting an upper steering shaft thereon by an upper column, the upper steering shaft being connected to the lower steering shaft by a universal joint, a spring provided between the fixed bracket and the tilt bracket and biasing the tilt bracket into an upward pivotal movement, a pivot member secured to the fixed bracket, a stopper member pivotally movably attached to the pivot member and selectively movable to a usual operation position or a retraction position, engaging means provided between the tilt bracket and the stopper member to hold the tilt bracket in an operation position against the spring when the stopper member is in its operation position or to permit the tilt bracket to be pivotally moved to an upward retracted position by the spring when the stopper member is in its retraction position, a retraction control lever pivotally movably attached to the pivot member so as to be selectively movable to an operation position or a retraction position, and change-over means provided between the control lever and the stopper member for holding the stopper member in its operation position when the control lever is in its operation position or permitting the stopper member to move to its retraction position when the control lever is in its retraction position.

The pivot member is secured to the fixed bracket, at a predetermined position or adjustingly movably along a circular arc centered about the pivot for the tilt bracket relative to the fixed bracket.

The retraction control lever, when moved to its retraction position, moves the stopper member to its retraction position, causing the spring to move the tilt bracket and the steering wheel to the retracted position. When the steering wheel is moved to its operation position to move the tilt bracket to its operation position, the stopper member and the control lever are returned to their respective operation positions, with the result that the tilt bracket and the steering wheel are held in the operation position. During the retraction and return movements, the pivot member remains secured to the fixed bracket without shifting. Accordingly, when the tilt bracket is returned to the operation position, the steering wheel is invariably returned to its original position.

In the case where the pivot member is secured to the fixed bracket so as to be adjustable in its position relative to the fixed bracket, the position of the pivot member is adjusted relative to the fixed bracket, with the retraction control lever, the stopper member and the tilt bracket held in their respective operation positions, to thereby cause the stopper member to move the tilt bracket, whereby the steering wheel on the tilt bracket is shifted upward or downward for fine adjustment. When the control lever is shifted to its retraction position with the pivot member held secured to the fixed bracket, the steering wheel is moved to the retracted position as described above. When the steering wheel is moved to its operation position, thereby moving the tilt bracket to its operation position, the steering wheel is held returned to the operation position as stated above. During the retraction and return movements, the pivot member remains fixed to the adjusted position without shifting. Accordingly, when the tilt bracket is returned to the operation position, it is invariably returned to the adjusted position. This eliminates the need to readjust the position.

With the tilt steering device of the invention, the steering wheel can be automatically moved to its retracted position merely by manipulating the retraction control lever. In the case where the pivot member is secured to the fixed bracket so as to be adjustable in its position relative to the fixed bracket, the steering wheel, when returned from the retracted position to the operation position, can be invariably returned to the previously adjusted position without necessitating readjustment.

BRIEF DESCRIPTION OF THE DRAWINGS

FIG. 8 is a view in horizontal section of the same;

FIG. 15 is a view in section taken along the line XV—XV in FIG. 14;

FIG. 16 is a fragmentary view in vertical section of a tilting assembly;

FIG. 23 is a diagram showing the relationship between a third stopper pin and a hook-shaped slot;

FIG. 24 is a fragmentary side elevation of another tilt steering device as a fourth embodiment;

FIG. 25 is fragmentary view in horizontal section of a tilting assembly;

FIG. 26 is a fragmentary side elevation of another tilt steering device as a fifth embodiment.

DESCRIPTION OF THE PREFERRED EMBODIMENTS

Tilt steering devices embodying the invention for use in motor vehicles will be described below with reference to the accompanying drawings.

FIGS. 1 to 12 show the first of the embodiments. In the following description, the left-hand side of FIGS. 1 and 2 will be referred to as the "front," the right-hand side thereof as the "rear," the upper and lower sides of FIG. 1 as such respectively, the lower side of FIG. 2 as the "left" and the upper side thereof as the "right."

Figure 1:
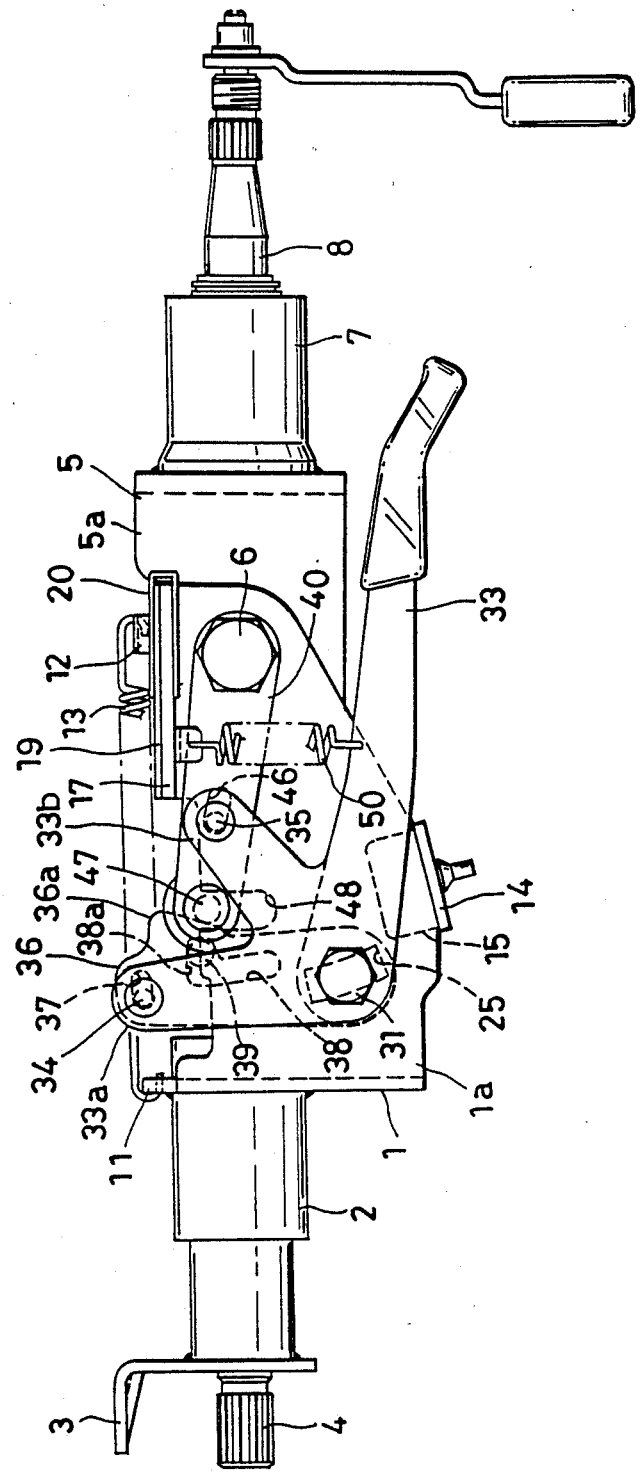
FIG. 1 is a side elevation showing the main components of a tilt steering device as a first embodiment of the invention.
Figure 2:
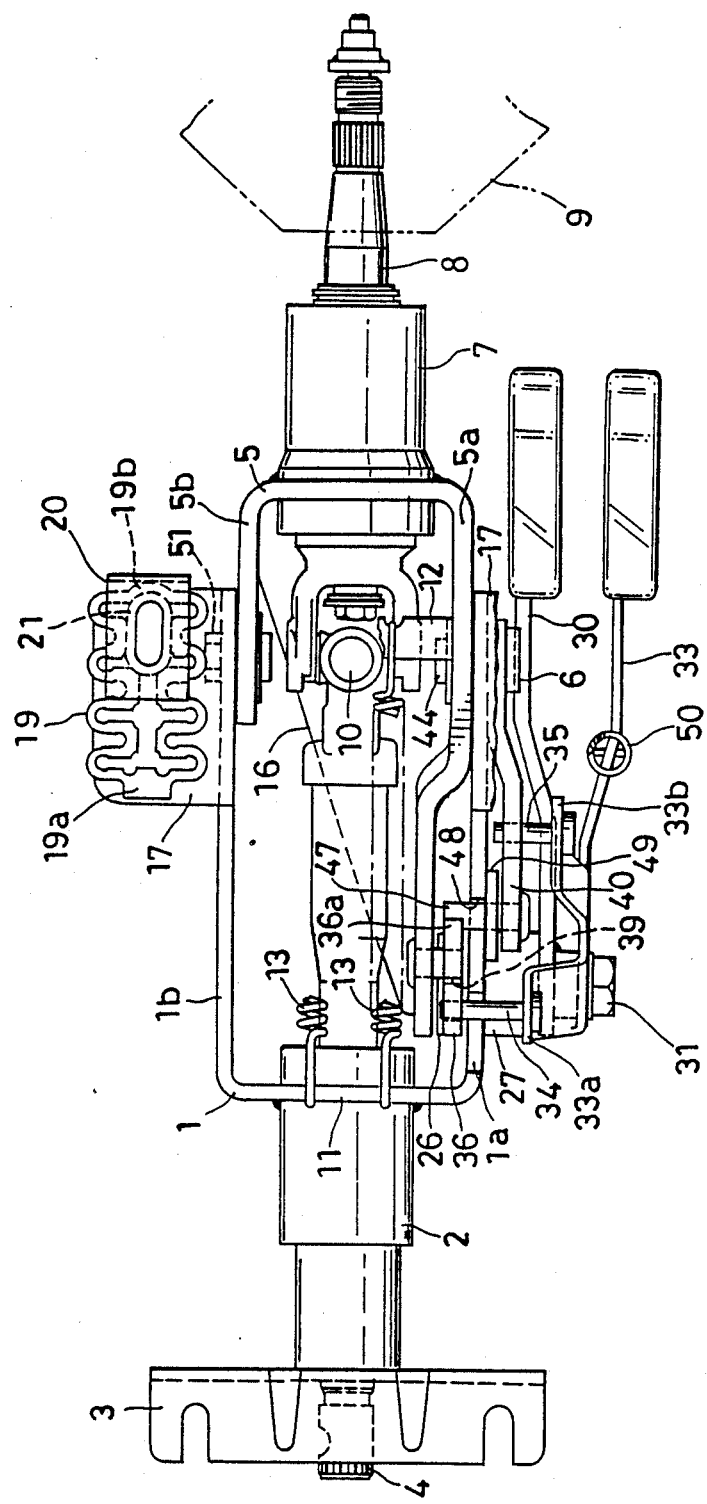
FIG. 2 is a plan view partly broken away and showing the same.

With reference to FIGS. 1 and 2 showing the overall construction of a tilt steering device, a bracket 1 is fixed to the body of a motor vehicle (not shown). When seen from above, the fixed bracket 1 is generally U-shaped and has an open rear end. A lower column 2 fixed to the front end of the fixed bracket 1 has a front end which is also fixed to a suitable portion of the vehicle body by a fastening member 3. A lower steering shaft (lower shaft) 4 extends through and is rotatably supported by the lower column 2. Although not shown, the front end of the lower shaft 4 is connected to a steering gear.

A tilt bracket 5 is pivoted at a rear portion thereof to the rear end of the fixed bracket 1 by two connecting pins 6, 51 extending transversely of the device. When seen from above, the tilt bracket 5 is generally U-shaped and open at its front portion. The left side portion 5a of the bracket 5 is disposed on the right side (inner side) of the left side portion 1a of the fixed bracket 1, and the right side portion 5b thereof on the left side (inner side) of the right side portion 1b of the fixed bracket 1. The left side portion 5a of the tilt bracket 5 extends forward beyond its right side portion 5b and has a front part bent rightward and positioned at a small distance rightward away from the left side portion 1a of the fixed bracket 1. An upper column 7 is fixed to the rear end of the tilt bracket 5. An upper steering shaft (upper shaft) 8 extends through and is rotatably supported by the upper column 7. A steering wheel 9 is attached to the rear end of the upper shaft 8. The front end of the upper shaft 8 is connected to the rear end of the lower shaft 4 by a universal joint 10. The center of the universal joint 10 is positioned at the center of pivotal movement of the tilt bracket 5, i.e., on the center line of the connecting pins 6, 51. Although not shown, the upper column 7 is provided with a telescopic drive portion for varying the length of the upper shaft 8 when so required. A coiled tension spring 13 is connected between a spring support portion 11 on the front-end upper side of the fixed bracket 1 and a spring support member 12 extending between and attached to upper-side rear portions of the tilt bracket 5, whereby the bracket 5 is biased into upward pivotal movement. A bottom plate 14 extends between and is attached to lower-side front portions of the fixed bracket 1. A stopper 15 made, for example, of rubber is positioned close to the left end of the bottom plate 14 and secured to the upper side of the plate 14. On the other hand, a bottom plate 16 is secured to the bottom of the tilt bracket 5 for regulating the upward pivotal movement of the bracket 5 by coming into contact with the stopper 15 on the fixed bracket 1.

Figure 3:
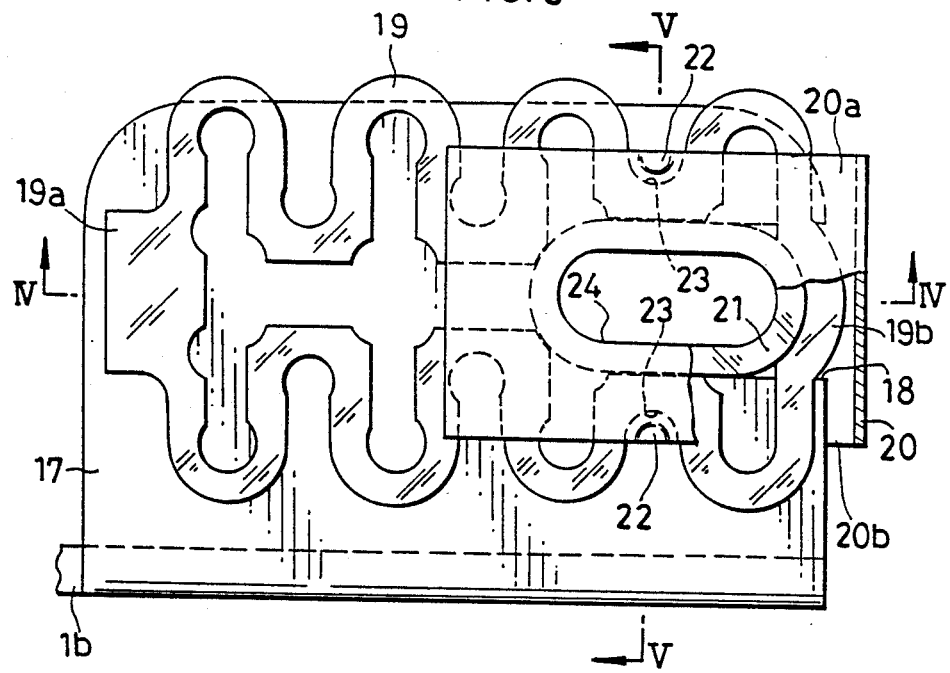
FIG. 3 is a plan view partly broken away and showing a mount bracket in FIG. 2 on an enlarged scale.
Figure 4:
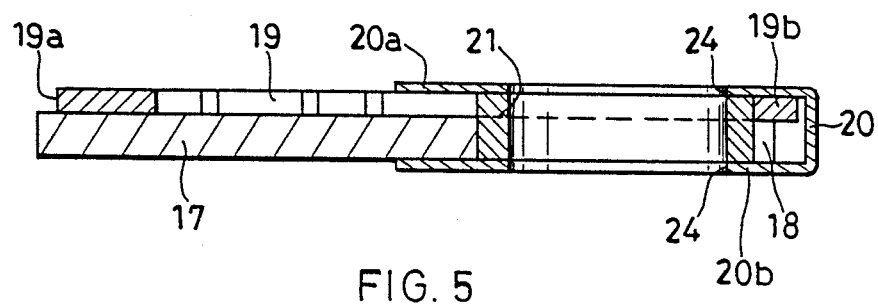
FIG. 4 is a view in section taken along the line IV—IV in FIG. 3.
Figure 5:
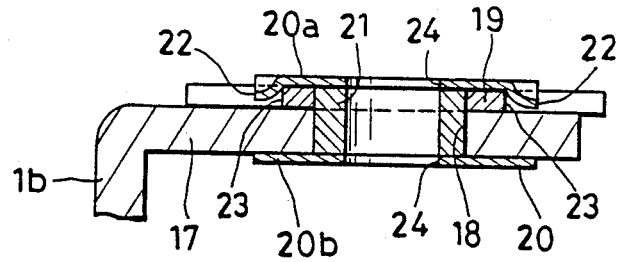
FIG. 5 is a view in section taken along the line V—V in FIG. 3.
Figure 6:
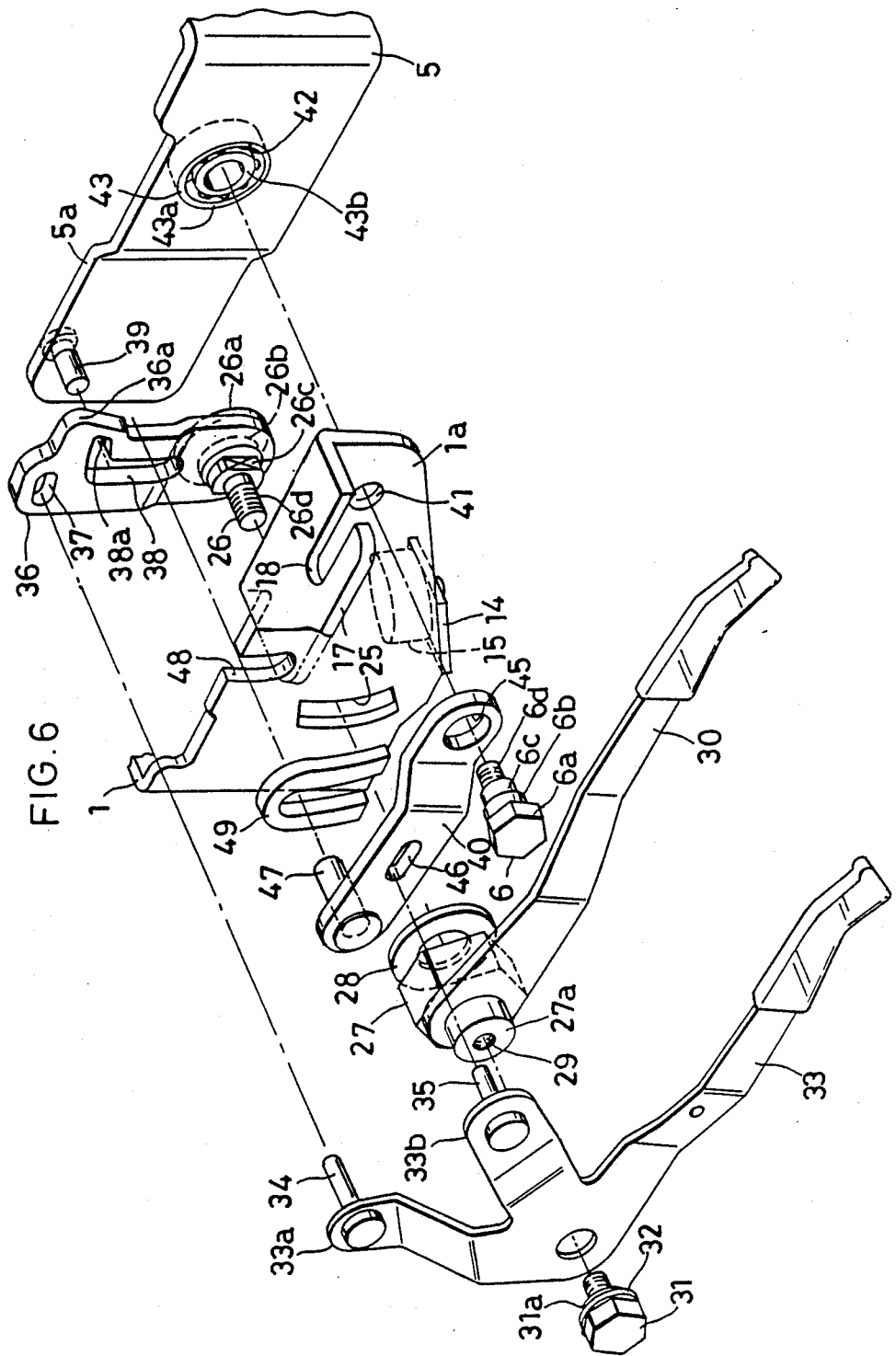
FIG. 6 is an exploded perspective view of a tilting assembly.
Figure 7:
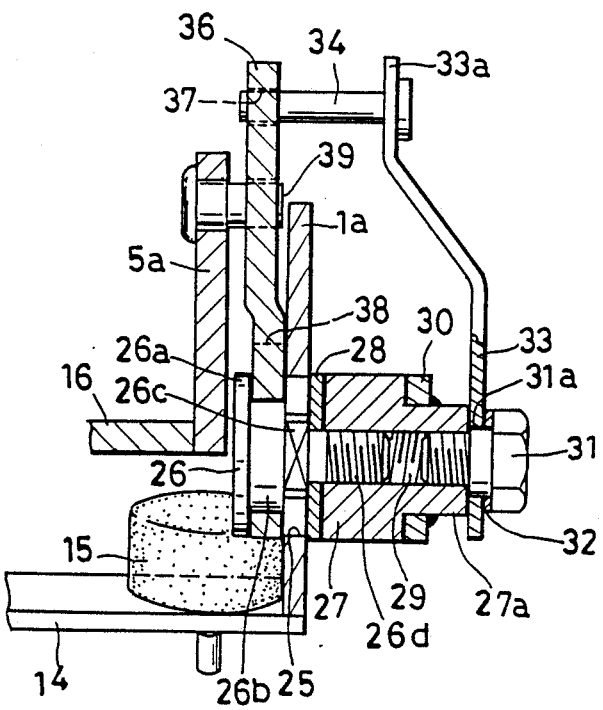
FIG. 7 is a fragmentary view in vertical section showing the assembly.
Figure 9:
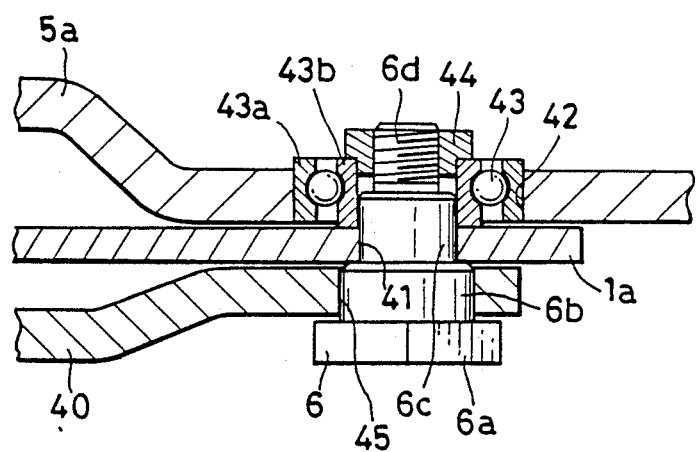
FIG. 9 is a view in horizontal section showing a fixed bracket and a tilt bracket in the vicinity of a connecting pin.

As shown in detail in FIGS. 3 to 5, the fixed bracket 1 is attached to the vehicle body by impact energy absorbing means.

The left side portion 1a and the right side portion 1b of the fixed bracket 1 is each integrally formed with a mount bracket 17 extending outward from the upper end of the rear part thereof. The mount bracket 17 is formed in its rear portion with an elongated cutout 18 extending rearward to its rear end. A shock absorbing member 19 in the form of a zigzag ring is provided on the upper surface of the mount bracket 17 and has a front end portion 19a welded to the front-portion upper surface of the bracket 17 and a rear end portion 19b extending over the rear portion of the cutout 18. A clip 20 comprising an upper plate 20a and a lower plate 20b and generally U-shaped in section is fitted over the rear portion of the assembly of the bracket 17 and the member 19 to hold the same from above and below. Between the clip upper and lower plates 20a, 20b, an elongated circular ring 21 is fitted in the cutout 18, as positioned to the front of the rear end portion 19b of the shock absorbing member 19. The upper plate 20a of the clip 20 is downwardly deformed at its opposite side edges to provide crimped portions 22, which are fitted in the rearmost inward recesses 23 of the shock absorbing member 19, whereby the clip 20 is fixed in place. The upper and lower plates 20a, 20b of the clip 20 are each formed with a hole 24 in conformity with the shape of the opening of the ring 21. The ring 21 is held between the inner peripheries of the plates defining the holes 24 against slipping off.

The spacing between the upper plate 20a and the lower plate 20b at the open front end of the clip 20 may be made smaller than the combined thickness of the mount bracket 17 and the shock absorbing member 19 to elastically hold the clip attached to the assembly of bracket and member against slipping off as is already known. However, the clip 20 is then difficult to fit over the assembly, whereas according to the present embodiment, the clip 20 is held in place by the crimped portions, so that the spacing at the open end of the clip 20 can be greater than the combined thickness to facilitate the fitting of the clip 20. Further when merely fitted over the mount bracket 17 from the rear, the crimped portions 22 can be fitted in the recesses 23 of the shock absorbing member 19. This also serves to position the clip 20 in place.

The fixed bracket 1 is fastened to the vehicle body by passing a bolt (not shown) through the holes 24 of the clip 20 and the opening of the ring 21 at the cutout portion 18 of each mount bracket 17 from below and screwing the bolt into the vehicle body. When the driver is struck against the steering wheel 9 by a force of inertia in the event of collision of the vehicle, a forward force acts on the fixed bracket 1, moving each mount bracket 17 forward out of engagement with the fastening bolt since the cutout 18 of the mount bracket 17 is left open at its rear end. On the other hand, the shock absorbing member 19, the clip 20 and the ring 21 are closed at their rear ends and therefore will not be released from the fastening bolt, with the result that the front end portion 19c of the shock absorbing member 19 is pulled forward by the mount bracket 17, whereby the energy of impact is absorbed.

As shown in detail in FIGS. 6 to 12, a tilting assembly is provided between the fixed bracket 1 and the tilt bracket 5 for finely adjusting the position of the steering wheel 9 in upward or downward direction and retracting the wheel 9.

The left side portion 1a of the fixed bracket 1 is formed at a position closer to its front end with a circular-arc slot 25 extending upward or downward and centered about the connecting pin 6. A tilt lever pivot (pivot member) 26 is inserted through the slot 25 from the right side. A pivot nut 27 provided with a washer 28 is screwed on the lever pivot 26 from the left side of the slotted portion 25. The lever pivot 26 has a head 26a, circular shank portion 26b, flat shank portion 26c and screw portion 26d as arranged from the right side leftward (or from the left side in FIG. 7, or from the upper side in FIG. 8). The flat shank portion 26c is fitted in the slot 25 so as to be movable longitudinally of the slot 25 while being prevented from rotation. The pivot nut 27 has a threaded bore 29 extending therethrough axially. The right side portion of the nut 27 is screwed on the screw portion 26d of the lever pivot 26. A fine adjustment control lever (first lever) 30 has a front end fitted around and welded to a circular shank portion 27a formed on the left side of the pivot nut 27 integrally therewith. When pivotally moved downward, the first lever 30, which extends rearward, tightens up the pivot nut 27 to lock the lever pivot 26 to the fixed bracket 1. When moved upward, the lever 30 loosens the pivot nut 27, rendering the lever pivot 26 movable along the slot 25 in the fixed bracket 1.

A special bolt 31 is screwed into the left side portion of the threaded bore 29 of the pivot nut 27 and fixed thereto. The bolt 31 has an intermediate circular shank portion 31a, around which a shim 33 and the front end of a retraction control lever (second lever) 33 are rotatably fitted. The second lever 33 also extends rearward and has front and rear two arms 33a, 33b projecting upward from its front end. A first stopper pin 34 and a second stopper pin 35 are fixed to the upper ends of the front arm 33a and the rear arm 33b, respectively. Each of these pins extends through the arm upper end from the left side thereof to project rightward. A coiled tension spring 50 is connected between the left mount bracket 17 on the fixed bracket 1 and an intermediate portion of the second lever 33 for biasing the second lever 33 upward.

A first stopper plate (stopper member) 36 is rotatably supported at its lower end by the circular shank portion 26b of the lever pivot 26. The first stopper plate 36 is integral with a projection 36a slightly projecting rearward from the upper portion of its rear end. The first stopper plate 36 is formed at its upper portion with a slot 37 slightly elongated longitudinally of the device. The first stopper pin 34 on the second lever 33 extends over the left side portion 1a of the fixed bracket 1 and is fitted in the slot 37. The first stopper plate 36 is centrally formed with a hook-shaped slot 38 vertically elongated and having a rearwardly bent upper end portion. A third stopper pin 39 is fixedly inserted through the front end of the tilt bracket left side portion 5a from the right side thereof to project leftward and is fitted in the hook-shaped slot 38. A second stopper plate 40 extending longitudinally of the device is rotatably supported at its rear end by the left connecting pin 6 on the brackets 1 and 5. The connecting pin 6 includes a head 6a, large-diameter shank portion 6b, small-diameter shank portion 6c and screw portion 6d which are arranged from the left rightward (from below upward in FIG. 9). A bearing 43 comprises an outer ring 43a fixed in a hole 42 in the tilt bracket left side portion 5a, and an inner ring 43b having the small shank portion 6c of the connecting pin 6 inserted therethrough. The shank portion 6c is further inserted through a hole 41 formed in the fixed bracket left side portion 1a. A nut 44 is screwed on the screw portion 6d to fasten the bearing inner ring 43b to the fixed bracket 1. Thus, the tilt bracket 5 is pivotally movable relative to the fixed bracket 1. The second stopper plate 40 is formed at its rear end with a hole 45 having the large shank portion 6b of the connecting pin 6 fitted therein rotatably. The second stopper plate 40 is formed at an intermediate portion thereof with a hole 46 slightly elongated longitudinally thereof and having fitted therein the second stopper pin 35 on the second lever 33. A fourth stopper pin 47 is fixedly inserted through the front end of the second stopper plate 40 from the left side to project rightward and is in contact with a rear portion of the first stopper plate 36. The fixed bracket 1 has a cutout 48 in its upper edge to avoid interference with the stopper pin 47. An inverted U-shaped reinforcement 49 is secured to the cutout (48) defining portion of the bracket 1.

The second and fourth stopper pins 35, 47 are eccentric pins and are adjustable in position when to be installed.

Figure 10:
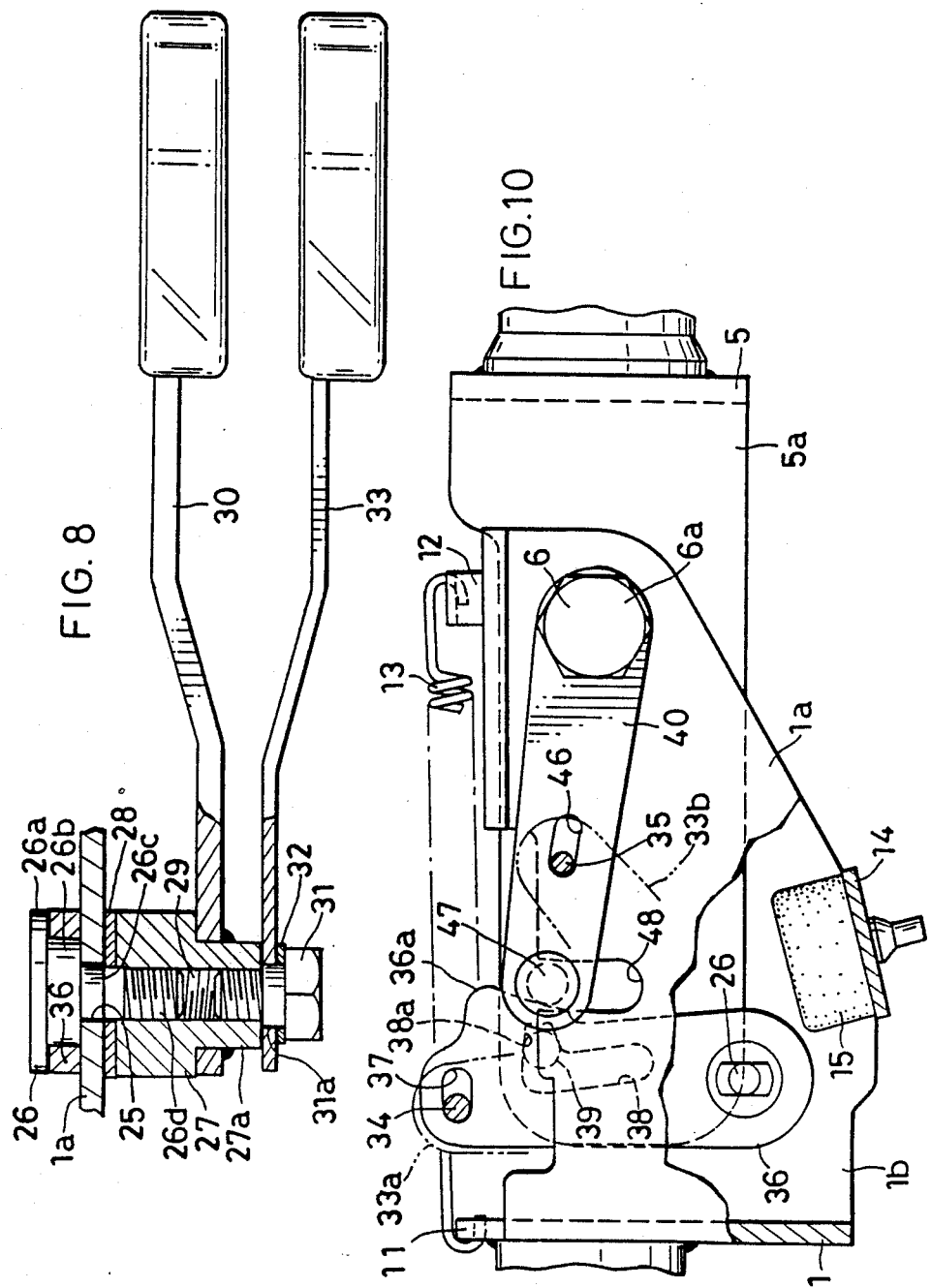
FIGS. 10, 11 and 12 are fragmentary side elevations partly broken away of the assembly to show a retraction movement stepwise.

FIGS. 1 and 10 show the tilt bracket 5 (and the steering wheel 9) as held in an operation position.

In this state, the first lever 30 has been moved downward to a locking position, tightening up the pivot nut 27 and locking the lever pivot 26 to the fixed bracket 1 as already stated. Accordingly, the first stopper plate 36 is movable about the lever pivot 26 but is not movable upward or downward. The second lever 33 has been brought upward to an operation position by being biased by the spring 50, the first stopper pin 34 is positioned at the front end of the slot 37 in the first stopper plate 36, and the second stopper pin 35 is positioned at the front end of the elongated hole 46 in the second stopper plate 40, holding the plate 40 lifted to an operation position. Consequently, the fourth stopper pin 47 on the second stopper plate 40 is in contact with the projection 36a of the first stopper plate 36, holding the plate 36 in a forward operation position. The third stopper pin 39 on the tilt bracket 5 is in the rear bent portion 38a of the hook-shaped slot 38 in the first stopper plate 36, whereby the tilt bracket 5 is held in its operation position against the force of the spring 13.

When the first lever 30 is moved upward to an unlocking position with the steering wheel 9 held in its operation position, the pivot nut 27 is loosened, rendering the lever pivot 26 movable along the slot 25 in the fixed bracket 1 as already described. This makes the steering wheel 9 movable upward or downward with the hand along with the tilt bracket 5 for finely adjusting the position. The upward or downward movement of the tilt bracket 5 also moves the first stopper plate 36 and the lever pivot 26 upward or downward owing to the engagement of the third stopper pin 39 in the bent portion 38a of the slot 38. When the parts are brought to a suitable position, the first lever 30 is shifted to the locking position to tighten up the pivot nut 27 to thereby lock the lever pivot 26, whereby the tilt bracket 5 and the steering wheel 9 are locked to the adjusted position.

After the steering wheel 9 has been locked in the adjusted position, the tilt bracket 5 and the steering wheel 9 can be automatically moved to a retracted position by moving the second lever 33 downward to a retraction position. When the steering wheel 9 in the retracted position is moved to the operation position with the hand, the wheel 9 can be held in the operation position again.

Figure 11:
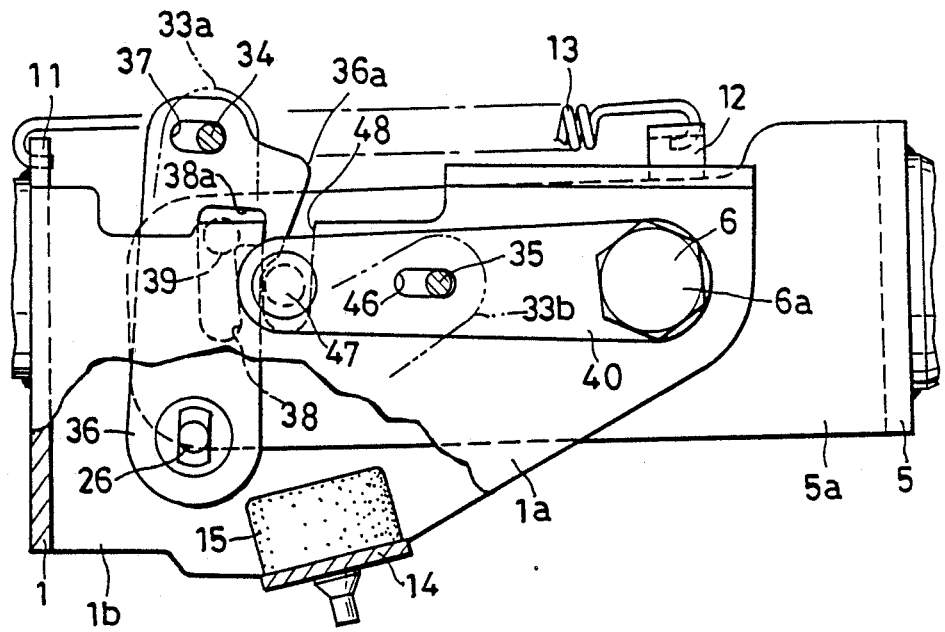
Figure 12:
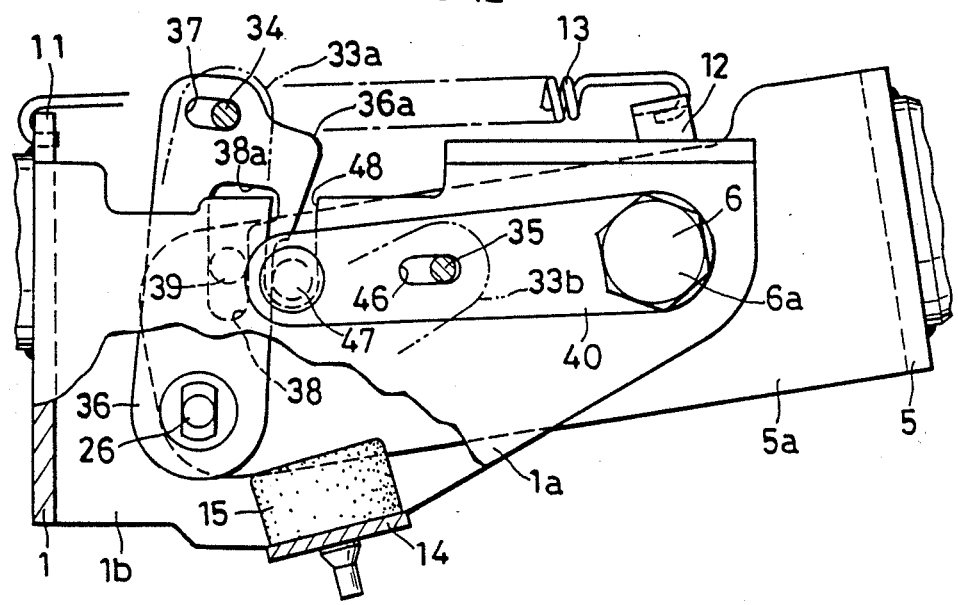

With reference to FIGS. 10 to 12, the operation of the tilting assembly for the above procedure will be described next.

As the second lever 33 is moved downward from the position shown in FIG. 10, the second stopper pin 35 thereon moves obliquely downward, thereby moving the second stopper plate 40 downward. When the plate 40 has been moved downward to some extent, the fourth stopper pin 47 moves downward out of contact with the projection 36a of the first stopper plate 36, permitting the plate 36 to pivotally move rearward. On the other hand, the downward movement of the second lever 33 moves the first stopper pin 34 obliquely rearward from the front end of the slot 37 in the first stopper plate 36 to the slot rear end. The pin 34 further pivotally moves the first stopper plate 36 rearward. When the first stopper plate 36 moves rearward to a retraction position, the hook-shaped slot 38 also moves rearward, so that the third stopper pin 39 on the tilt bracket 5 moves out of the bent portion 38a of the slot 38 (state of FIG. 11), permitting the spring 13 to move the tilt bracket 5 and the steering wheel 9 upward. The third stopper pin 39 therefore moves through the slot 38 downward. The tilt bracket 5 and the bottom plate 16 thereof come into contact with the stopper 15 of the fixed bracket 1, whereby the steering wheel 9 is stopped at the retracted position (state of FIG. 12).

When the steering wheel 9 as pivotally moved to the retracted position is moved downward with the hand, the tilt bracket 5 also moves downward, allowing the third stopper pin 39 on the bracket 5 to move upward through the hook-shaped slot 38 in the first stopper plate 36. Since the second lever 33 is moved upward by the spring 50, the first stopper pin 34 moves the first stopper plate 36 forward to its operation position, and the second stopper pin 35 moves the second stopper plate 40 upward to its operation position, bringing the fourth stopper pin 37 on the plate 40 into contact with the projection 36a of the first stopper plate 36 to hold the plate 36 in its operation position. Since the first stopper plate 36 moves forward with the third stopper pin 39 on the tilt bracket 5 positioned at the upper end of the slot 38, the third stopper pin 39 fits into the bent portion of the slot 38, holding the tilt bracket 5 and the steering wheel 9 in the operation position.

During the retraction and return movements described above, the lever pivot 26 remains locked in the previously adjusted position without shifting. The tilt bracket 5 is held in its operation position by the first stopper plate 36 which is only rotatable relative to the pivot 26, so that the tilt bracket 5 is invariably returned to the adjusted position when returned to the operation position, hence no need for readjustment.

Figure 13:
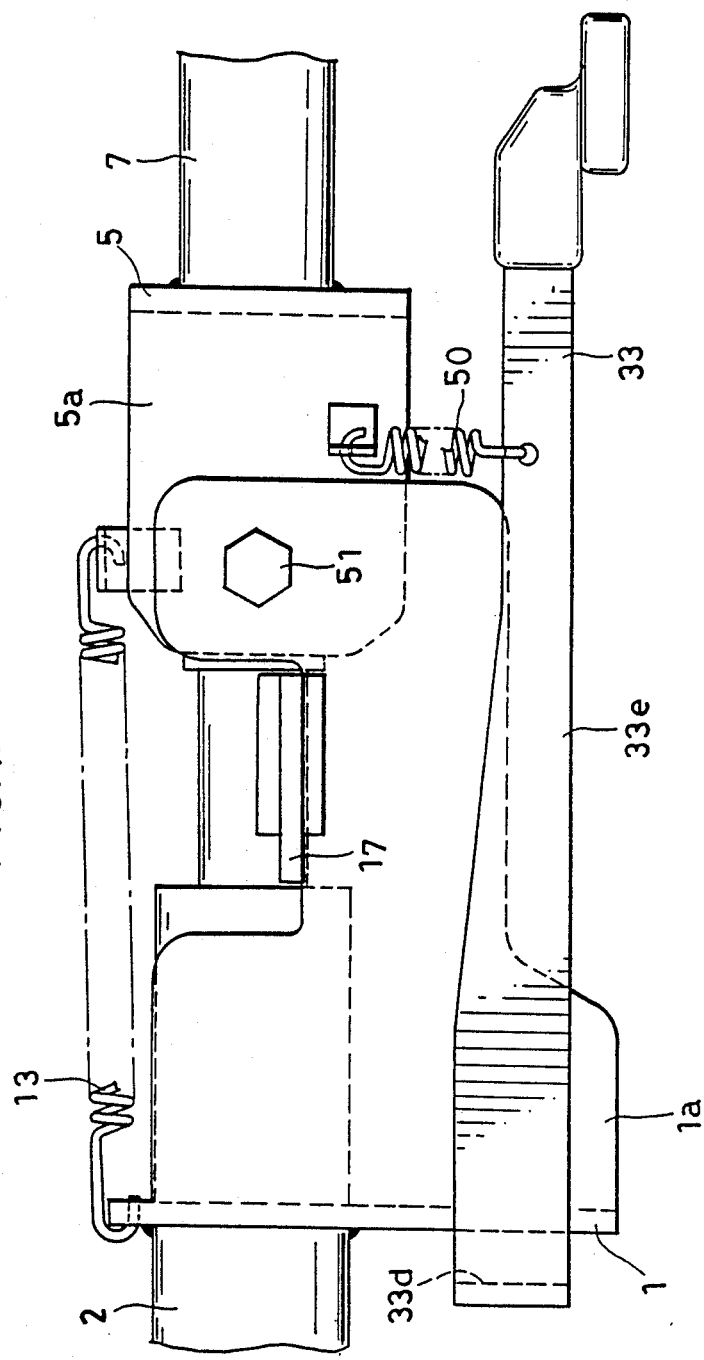
FIG. 13 is a fragmentary side elevation of another tilt steering device as a second embodiment.
Figure 14:
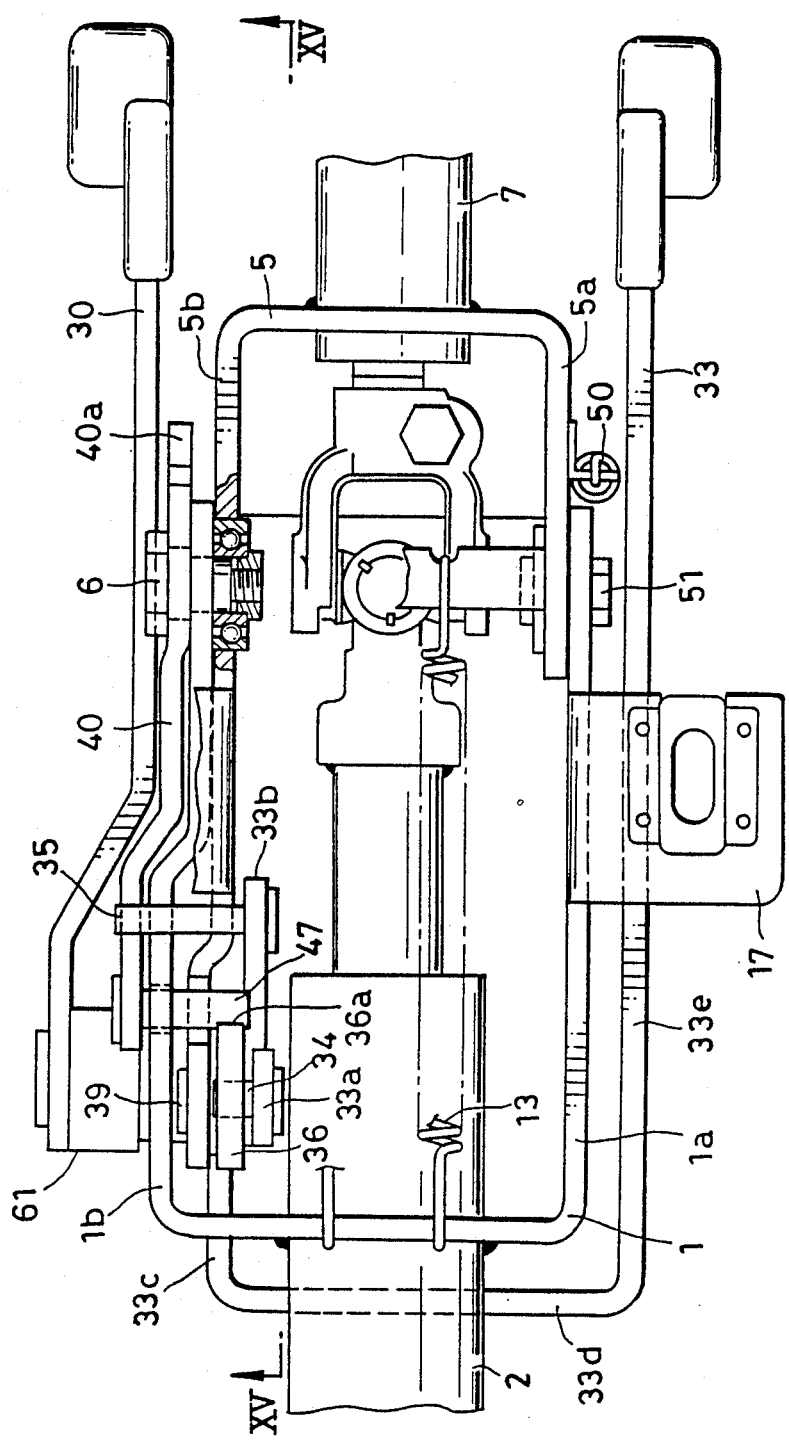
FIG. 14 is a plan view partly broken away and showing the same.

FIGS. 13 to 18 show a second embodiment. Throughout FIGS. 1 to 18, like parts are designated by like reference numerals. In the following description, the left-hand side of FIGS. 13 to 15 is referred to as the "front," the right-hand side thereof as the "rear," the upper and lower sides of FIGS. 13 and 15 as such respectively, the lower side of FIG. 14 as the "left" and the upper side thereof as the "right."

In the case of the second embodiment, a tilting assembly is provided on the right side portions 1b, 5b of a fixed bracket 1 and a tilt bracket 5.

A tilt lever pivot (pivot member) 60 is fitted in a slot 25 formed in the right side portion 1b of the fixed bracket 1. The lever pivot 60 has a first screw portion 60a, flat shank portion 60b, first circular shank portion 60c, flange portion 60d, second circular shank portion 60e and second screw portion 60f which are arranged from the right side leftward (from the left side rightward in FIG. 16). The flat shank portion 60b of the pivot 60 is fitted in the slot 25 from the left side thereof so as to be movable along the length of the slot 25 while being prevented from rotation. A pivot nut 61 secured to the front end of a first lever 30 is screwed on the first screw portion 60a projecting rightward from the right side portion 1b of the fixed bracket 1. When the first lever 30, which extends rearward, is pivotally moved downward, the pivot nut 61 is tightened up to lock the lever pivot 60 to the fixed bracket 1. When moved upward, the first lever 30 loosens the nut 61, rendering the lever pivot 60 movable along the slot 25 in the fixed bracket 1. This arrangement is the same as the corresponding arrangement of the first embodiment.

A first stopper plate 36 is rotatably supported at its lower portion by the pivot first circular shank portion 60c between the fixed bracket right side portion 1b and the pivot flange portion 60d positioned on the left side thereof.

A special nut 62 is fixedly screwed on the second screw portion 60f of the lever pivot 60. A second lever 33 is rotatably supported by the second circular shank portion 60e between the nut 62 and the pivot flange portion 60d. When seen from above, the second lever 33 is generally U-shaped and open at its rear portion. The lever 33 includes a right side portion 33c attached at its rear end to the lever pivot 60 and having two arms 33a, 33b. The lever right side portion 33c extends forward slightly beyond the fixed bracket 1 under the bracket 1. The lever 33 further includes an intermediate portion 33d extending from the front end of the portion 33c leftward in front of and along the bracket 1 slightly beyond the bracket 1, and a left side portion 33e extending from the left end of the intermediate portion 33d rearward beyond the right side portion 33c and spaced at a small distance from the left side of the bracket 1. The second lever 33 is pivotally movable in its entirety with the hand holding the rear end of the left side portion 33e.

A connecting pin 6 is attached to the right side portions 1b, 5b of the fixed bracket 1 and the tilt bracket 5. A third stopper pin 39 fitting in a hook-shaped slot 38 in the first stopper plate 36 is fixed to the front part of the tilt bracket right side portion 5b which part is positioned to the front of the connecting pin 6.

The portion of the connecting pin 6 projecting rightward beyond the tilt bracket right side portion 5b rotatably supports a portion of a second stopper plate 40 close to its rear end 40a. A coiled tension spring 63 for biasing the second stopper plate 40 in a direction to move its front portion upward is connected between the rear end 40a, to the rear of the pin 6, of the plate 40 and a right side part of the tilt bracket right side portion 5b which part is positioned below the rear end 40a. The intermediate portion of the second stopper plate 40 to the front of the connecting pin 6 is not formed with the elongated hole 46 of the first embodiment, but the upper edge of the intermediate portion is formed with a recess 64 instead. The recessed portion 64 is pressed into contact with a second stopper pin 35 on the second lever 33 by the spring 63.

Figure 17:
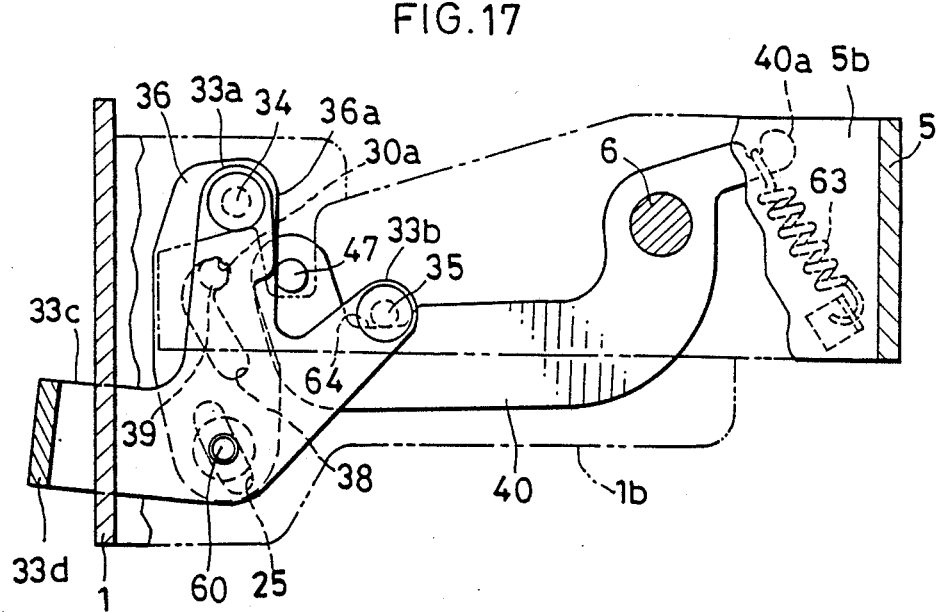
FIGS. 17 and 18 are fragmentary side elevations partly broken away of the assembly to show a retraction movement stepwise.
Figure 18:
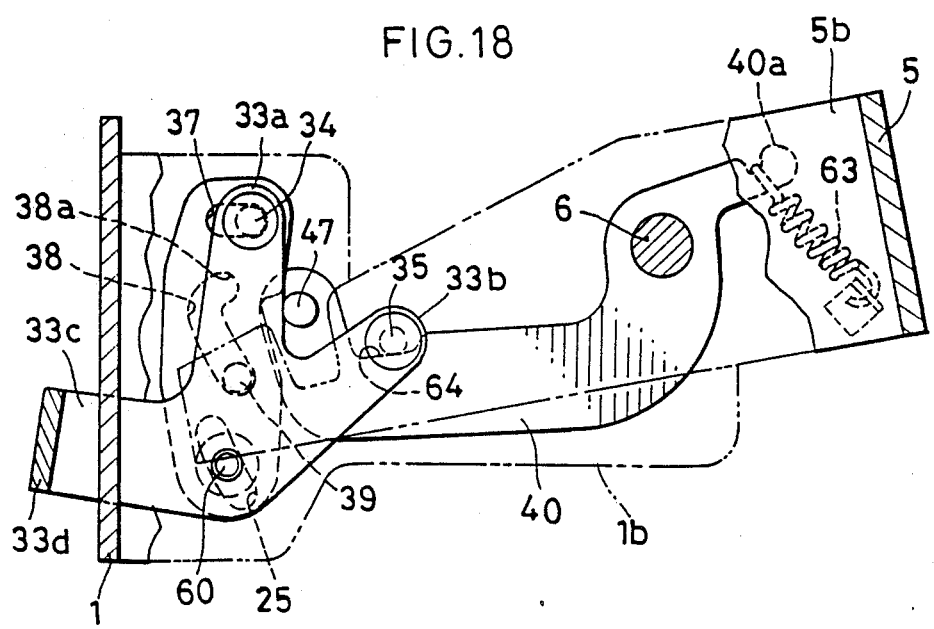

With the first embodiment, the second stopper pin 35 is fitted in the elongated hole 46 in the second stopper plate 40, whereby the second lever 33 is linked to the second stopper plate 40, whereas with the second embodiment, the recessed portion 64 of the second stopper plate 40 is pressed into contact with the second stopper pin 35 by the spring 63, whereby the second lever 33 is linked to or associated with the second stopper plate 40. Instead of the cutout 48 of the fixed bracket 1 of the first embodiment, a slot 65 for passing a fourth stopper pin 47 therethrough is formed in the right side portion 1b of the fixed bracket 1. With the exception of the above features, the second embodiment is similar to the first embodiment in respect of the retraction operation of the tilting assembly. FIG. 15 shows the tilting assembly with the tilt bracket 5 held in its operation position. FIG. 18 shows the same with the tilt bracket 5 pivotally moved to its retracted position. FIG. 17 shows a state intermediate between these two states. The tilting assembly of the second embodiment also operates in the same manner as in the first for the fine adjustment of position.

With the second embodiment, the intermediate flat shank portion 60b of the lever pivot 60 is fitted in the slot 25 in the fixed bracket while being prevented from rotation, and the first lever 30 and the second lever 33 are supported by the pivot 60 on the right and left sides of the shank portion 60b, respectively, so that no rotation of the first lever 30 is transmitted to the second lever 33. This eliminates the likelihood that when the first lever 30 is pivotally moved for tilting, the second lever 33 will also move therewith for retraction.

The second embodiment is the same as the first with the exception of the above features.

FIGS. 19 to 23 show a third embodiment. Throughout the drawings showing the first and third embodiments, like parts are designated by like reference numerals. In the following description, the left-hand side of FIGS. 19 and 20 will be referred to as the "front," the right-hand side thereof as the "rear," the upper and lower sides of FIG. 19 as such, respectively, the lower side of FIG. 20 as the "left," and the upper side thereof as the "right."

The third embodiment corresponds to the first embodiment from which omitted are the second stopper plate 40, and the rear arm 33b of the second lever 33 and the second stopper pin 35 which are linked with the plate. The third embodiment has the same construction as the first except this feature.

When the tilt bracket 5 is held in its operation position, the second stopper plate 40 of the first embodiment prevents the first stopper plate 36 from rearward pivotal movement that moves the third stopper pin 39 on the tilt bracket 5 out of the bent portion 38a of the hook-shaped slot 38. However, this can be prevented when the slot 38 is suitably shaped and dimensioned as will be described below even in the absence of the second stopper plate 40.

Figure 19:
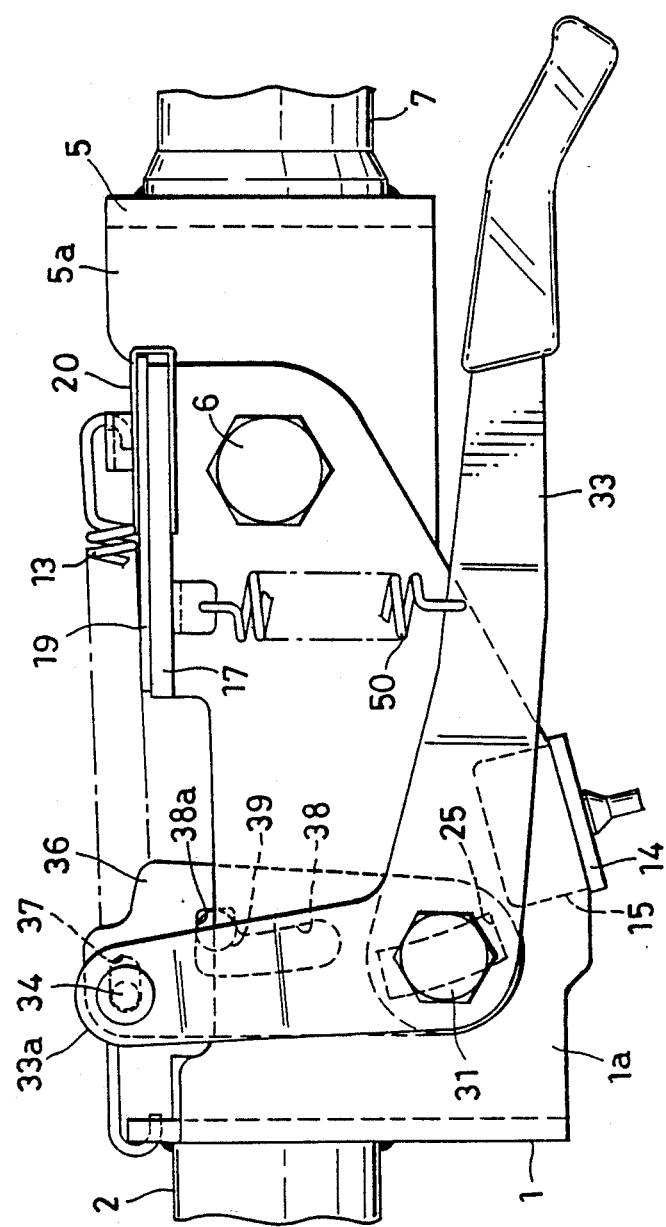
FIG. 19 is a fragmentary side elevation showing a tilt steering device as a third embodiment.
Figure 20:
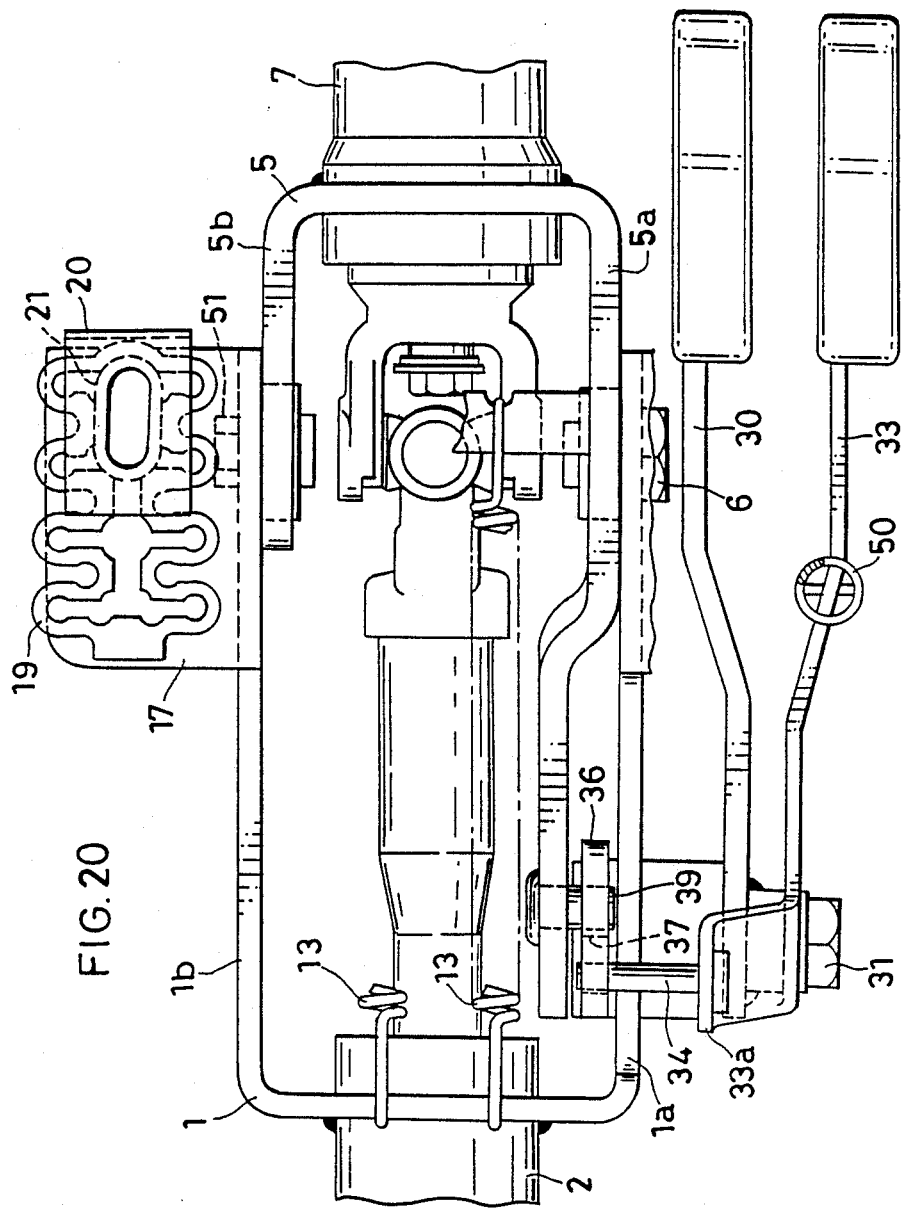
FIG. 20 is a plan view partly broken away and showing the same.

FIG. 19 shows the tilt bracket 5 as held in its operation position. FIG. 23 shows the relationship involved in this state between the third stopper pin 39 and the bent portion 38a of the hook-shaped slot 38 in the first stopper plate 36. At this time, the second lever 33 is in its upward operation position by being biased by the spring 50, and the first stopper pin 34 is positioned at the front end of the slot 37 in the first stopper plate 36, holding the plate 36 in its forward operation position. The third stopper pin 39 on the tilt bracket 5 is in the bent portion 38a of the hook-shaped slot 38 in the first stopper plate 36. The upper edge A and the lower edge B defining the bent portion 38a are so formed that the spacing therebetween increases toward the front. In the above state, the center line C of the bent portion 38a extends through the center of the connecting pin 6 on the fixed bracket 1 and the tilt bracket 5. The upper edge A and the lower edge B are at a given angle $\alpha$ with the center line C. The third stopper pin 39 on the tilt bracket 5 is pressed into contact with the lower edge B of the bent portion 38a by being biased by the spring 13 in a direction to revolve downward about the connecting pin 6. Accordingly, if the force of friction between the third stopper pin 39 and the lower edge B is greater than the component of the force of the spring 13 in parallel to the lower edge B, the pin does not slide on the edge, and the first stopper plate 36 and the tilt bracket 5 can be held in their respective operation positions. Assuming that the coefficient of friction between the third stopper pin 39 and the lower edge B is $\mu$, the condition under which no relative sliding movement occurs therebetween is given by Equation (1).

$$\tan \alpha < \mu \tag{1}$$

The coefficient of friction, $\mu$, between the third stopper pin 39 and the bent portion lower edge B is usually about 0.15 but is assumed to be 0.1 to ensure reliability. From Equation (1), the angle $\alpha$ is then given by:

$$\tan \alpha < 0.1$$

$$\alpha < 5.71 \text{ degrees}$$

Accordingly, if the angle $\alpha$ is up to 5.7 degrees, no sliding occurs.

Figure 21:
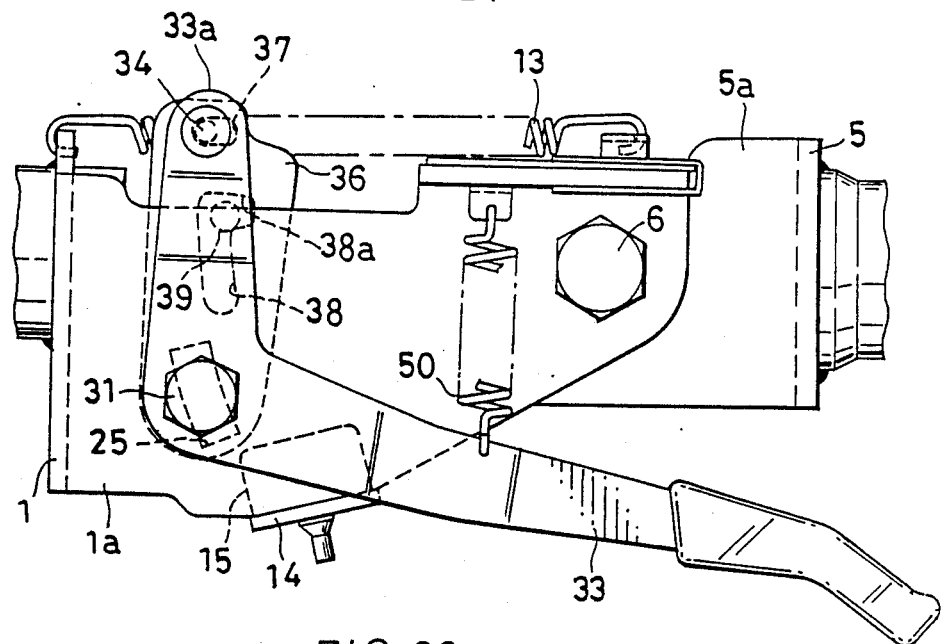
FIGS. 21 and 22 are side elevations partly broken away and showing a tilting assembly in retraction movement stepwise.
Figure 22:
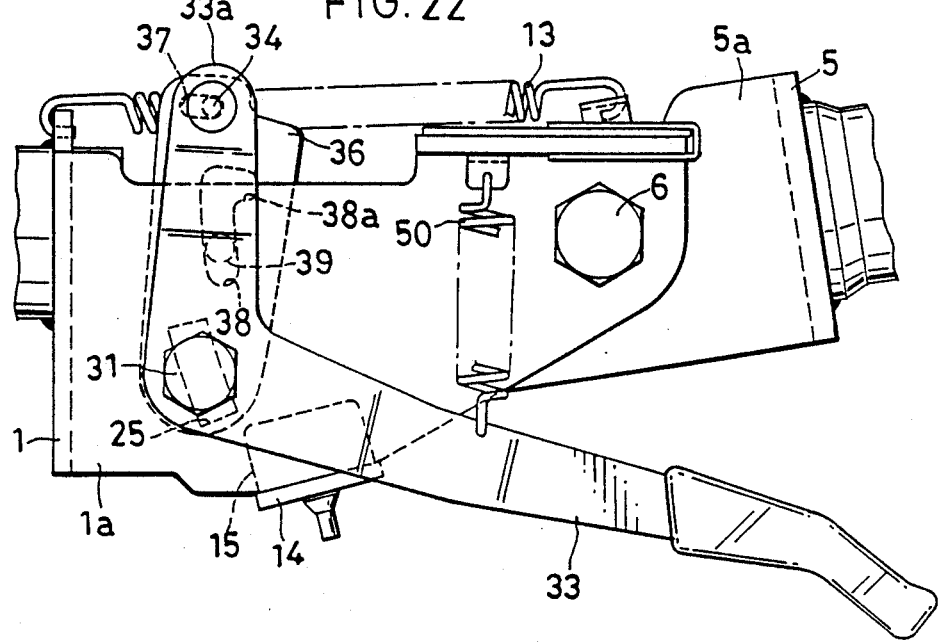

Next, the retraction movement of the tilting assembly will be described with reference to FIGS. 19, 21 and 22.

As the second lever 33 is pivotally moved downward from the position shown in FIG. 19, the first stopper pin 34 moves obliquely rearward from the front end of the slot 37 in the first stopper plate 36 to the slot rear end. The pin 34 further pivotally moves the first stopper plate 36 rearward. When the first stopper plate 36 moves rearward to a retraction position, the hook-shaped slot 38 also moves rearward, so that the third stopper pin 39 on the tilt bracket 5 moves out of the bent portion 38a of the slot 38 (state of FIG. 21), permitting the spring 13 to move the tilt bracket 5 and the steering wheel 9 upward, which are stopped at the retracted position (state of FIG. 22).

When the steering wheel 9 as pivotally moved to the retracted position is moved downward with the hand, the tilt bracket 5 also moves downward, allowing the third stopper pin 39 on the bracket 5 to move upward through the hook-shaped slot 38 in the first stopper plate 36. On the other hand, the second lever 33 is biased upward by the spring 50, with the first stopper pin 34 thereon bearing against the front end of the slotted portion 37 of the first stopper plate 36 to bias the plate 36 forward. Consequently, when the third stopper 39 moves forward through the bent portion 38a of the hook-shaped slot 38, the first stopper plate 36 pivotally moves forward, permitting the third stopper pin 39 to fit into the bent portion 38a, whereby the tilt bracket 5 is held in its operation position.

The tilting assembly of the third embodiment operates in the same manner as in the first embodiment for position fine adjustment.

FIGS. 24 and 25 show a fourth embodiment. Throughout the drawings showing the first and fourth embodiments, like parts are designated by like reference numerals. In the following description, the left-hand side of FIG. 24 will be referred to as the "front," the right-hand side thereof as the "rear," and the upper and lower sides thereof each as such.

The tilting assembly of the fourth embodiment is adapted for a retraction movement only and is not operable for position fine adjustment. Accordingly, the first lever 30 included in the first embodiment is not provided. A tilt lever pivot (pivot member) 70 is secured at a predetermined position to the left side portion 1a of a fixed bracket 1. The lever pivot 70 has a head 70a, a first circular shank portion 70b having a smaller diameter than the head, a second circular shank portion 70c having a smaller diameter than the portion 70b, a third circular shank portion 70d having a smaller diameter than the portion 70c, and a screw portion 70e having a smaller diameter than the portion 70d which are arranged from the right side leftward (from the upper side downward in FIG. 25). The second circular shank portion 70c is fitted in a circular hole 71 in the left side portion 1a of the fixed bracket 1 from the right side and secured thereto by suitable means as by welding. A first stopper plate 36 is rotatably fitted at its lower end around the first circular shank portion 70b between the bracket left side portion 1a and the head 70a on the right side thereof. A special nut 72 is fixedly screwed on the screw portion 70e. A second lever 33 is rotatably supported by the third circular shank portion 70d between the nut 72 and the second circular shank portion 70c. A coiled tension spring 63 for biasing the front portion of a second stopper plate 40 upward is connected between the rear end 40a of the second stopper plate 40 and a lower part of the left side portion 5a of a tilt bracket 5.

When the tilt bracket 5 is held in its operation position as seen in FIG. 24, a connecting pin 6, second stopper pin 35, fourth stopper pin 47 and third stopper pin 39 are aligned along a straight line, which is perpendicular to a straight line through the centers of the third stopper pin 39 and the lever pivot 70. Accordingly, the arrangement has high rigidity, properly holding the tilt bracket 5 in its operation position. In this state, the fourth stopper pin 47 on the second stopper plate 40 is pressed against a projection 36a of the first stopper plate 36 by the action of the spring 63. The second stopper pin 35 on the second lever 33 is positioned in the front portion of an elongated hole 46 in the second stopper plate 40. To preclude the second stopper pin 35 from giving off a noise on striking against the hole (46) defining wall, the vertical width of the front portion of the hole 46 is considerably larger than the outside diameter of the second stopper pin 35. Furthermore, the rear portion of the elongated hole 46 is smaller than the front portion thereof in vertical width so that when the second stopper pin 35 moves obliquely rearwardly downward for retraction, the pin 35 will bear on the lower edge defining the hole 46 to properly move the second stopper plate 40 downward pivotally.

The fourth embodiment is the same as the first with the exception of the above features and operates in the same manner as the first except that the tilting assembly of the former is not adapted for position fine adjustment.

Figure 27:
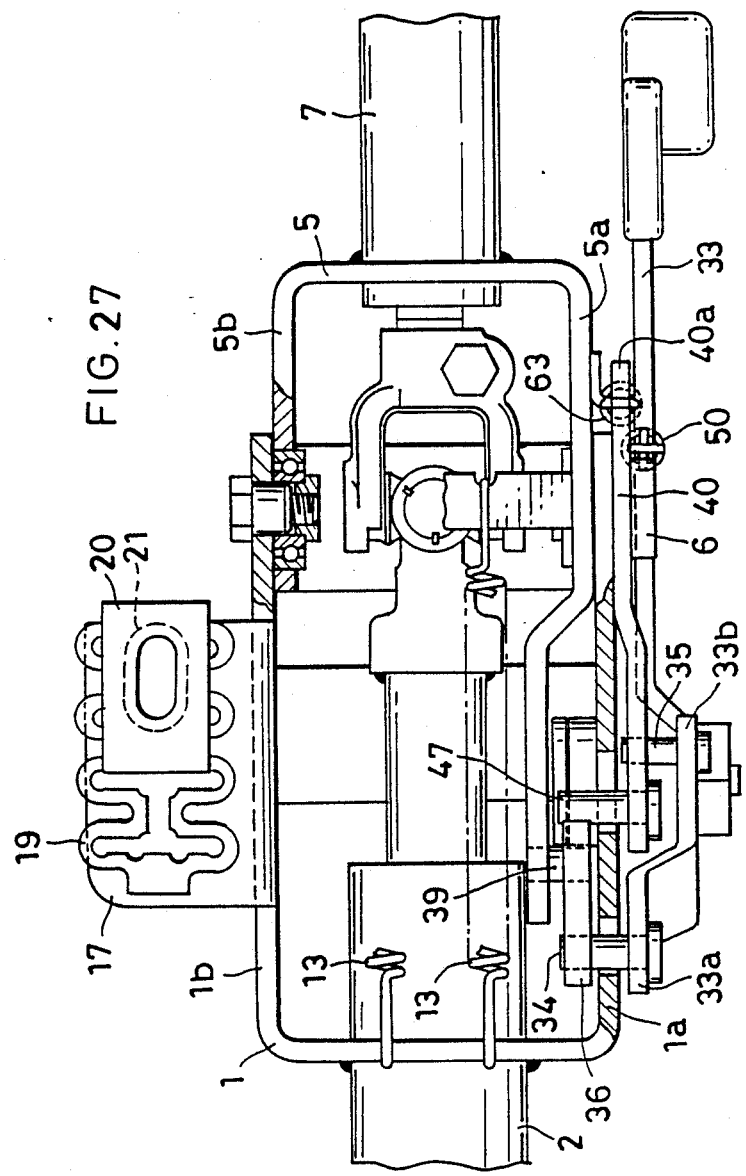
FIG. 27 is a plan view partly broken away and showing the same.

FIGS. 26 and 27 show a fifth embodiment. Throughout FIGS. 24 to 27, like parts are designated by like reference numerals.

The fifth embodiment differs from the fourth embodiment, for example, in the shape of the second lever 33 and the second stopper plate 40. Further instead of a cutout 48 formed in the fixed bracket left side portion 1a of the fourth embodiment, a slot 65 for the fourth stopper pin 47 to pass therethrough is formed.

With the exception of the above feature, the fifth embodiment has the same construction as the fourth.

What is claimed:

1. A tilt steering device comprising a fixed bracket fixed to the body of a vehicle and supporting a lower steering shaft thereon by a lower column, a tilt bracket pivoted upwardly or downwardly to the fixed bracket and supporting an upper steering shaft thereon by an upper column, the upper steering shaft being connected to the lower steering shaft by a universal joint, a spring provided between the fixed bracket and the tilt bracket and biasing the tilt bracket into an upward pivotal movement, a pivot member secured to the fixed bracket, a stopper member pivotally movably attached to the pivot member and selectively movable to a usual operation position or a retraction position, engaging means provided between the tilt bracket and the stopper member to hold the tilt bracket in an operation position against the spring when the stopper member is in its operation position or to permit the tilt bracket to be pivotally moved to an upward retracted position by the spring when the stopper member is in its retraction position, a retraction control lever pivotally movably attached to the pivot member so as to be selectively movable to an operation position or a retraction position, and change-over means provided between the control lever and the stopper member for holding the stopper member in its operation position when the control lever is in its operation position or permitting the stopper member to move to its retraction position when the control lever is in its retraction position.

2. A tilt steering device as defined in claim 1 wherein the pivot member is secured to the fixed bracket at a predetermined position.

3. A tilt steering device as defined in claim 1 wherein the pivot member is secured to the fixed bracket so as to be adjustable in its position relative to the fixed bracket along a circular arc centered about the pivot for the tilt bracket.

4. A tilt steering device as defined in claim 3 wherein the fixed bracket is formed with a circular-arc slot centered about the pivot for the tilt bracket, and the pivot member is fitted in the slot so as to be movable along the length of the slot while being prevented from rotation, a pivot nut being secured to a fine adjustment control lever and screwed on a screw portion formed on the pivot member, whereby the pivot member can be locked to the fixed bracket adjustably in its position, the retraction control lever being rotatably attached to the pivot nut.

5. A tilt steering device as defined in claim 3 wherein the fixed bracket is formed with a circular-arc slot centered about the pivot for the tilt bracket, and the pivot member is fitted in the slot so as to be movable along the length of the slot while being prevented from rotation, the pivot member having a screw portion formed on a portion thereof projecting from one side of the fixed bracket, a pivot nut being secured to a fine adjustment control lever and screwed on the screw portion, whereby the pivot member can be locked to the fixed bracket, the retraction control lever being rotatably attached to a portion of the pivot member projecting from the other side of the fixed bracket.

6. A tilt steering device as defined in claim 1 wherein the engaging means comprises a stopper pin provided on one of the tilt bracket and the stopper member, and a hook-shaped slot formed in the other of the tilt bracket and the stopper member for the stopper pin to fit in.

7. A tilt steering device as defined in claim 6 wherein the change-over means comprises a stopper pin provided on one of the retraction control lever and the stopper member, and a hole formed in the other of the lever and the member for the stopper pin to fit in.

8. A tilt steering device as defined in claim 6 wherein the change-over means comprises a stopper pin provided on one of the retraction control lever and the stopper member, a hole formed in the other of the lever and the member for the stopper pin to fit in, a second stopper member rotatably attached to the pivot for the tilt bracket and having a movable end bearing on the first-mentioned stopper member, and a stopper pin provided on one of the second stopper member and the retraction control lever and engageable with the other thereof, the first-mentioned stopper member being holdable in its operation position by the second stopper member when the retraction control lever is in its operation position.

* * * * *